United States Patent [19]

Kaneko

[11] Patent Number: 4,834,311
[45] Date of Patent: May 30, 1989

[54] FISHLINE SLIP-OFF PREVENTION DEVICE FOR A SPINNING REEL

[75] Inventor: Kyoichi Kaneko, Tokyo, Japan

[73] Assignee: Daiwa Seiko, Inc., Tokyo, Japan

[21] Appl. No.: 249,668

[22] Filed: Sep. 27, 1988

[30] Foreign Application Priority Data

Oct. 15, 1987 [JP] Japan ............................ 62-260520

[51] Int. Cl.$^4$ ............................................. A01K 89/01
[52] U.S. Cl. .......................... 242/84.1 K; 242/84.2 R; 242/84.21 R
[58] Field of Search ...................... 242/84.1 K, 84.1 R, 242/84.2 R, 84.2 G, 84.2 F, 84.21 R, 84.21 A

[56] References Cited

U.S. PATENT DOCUMENTS 2,884,211 4/1959 Holahan ......................... 242/84.1 K
3,946,963 3/1976 Oberg ............................ 242/84.21 R
4,561,604 12/1985 Matsushima ............. 242/84.21 R X
4,778,124 10/1988 Shinohara .................... 242/84.21 R Primary Examiner—David Werner
Assistant Examiner—Katherine Matecki
Attorney, Agent, or Firm—Kalish & Gilster

[57] ABSTRACT

A fishline slip-off prevention device for a spinning reel according to the pressent invention is to prevent a fishline from entering to the rotor side. The fishline slip-off prevention device is constructed such that a fishline ingress inhibitor held in abutment against a flanged portion of a spool is swingably supported to a bail support arm and also urged toward the spool by an urging mechanism, so the fishline ingress inhibitor positively abuts against the flanged portion of the spool and hence the fishline can positively be prevented from entering the rotor side while the rotor is in rest or being rotated at low speeds during which time the fishline more likely tends to slip off the spool. While the rotor is being rotated at medium or high speeds during which time the fishline is relatively hard to slip off the spool, the fishline ingress inhibitor is subjected to a relatively large centrifugal force so that the abutting force of the fishline ingress inhibitor against the flanged portion of the spool is lessened, or a small gap is created between the fishline ingress inhibitor and the flanged portion under the action of such a centrifugal force.

4 Claims, 5 Drawing Sheets

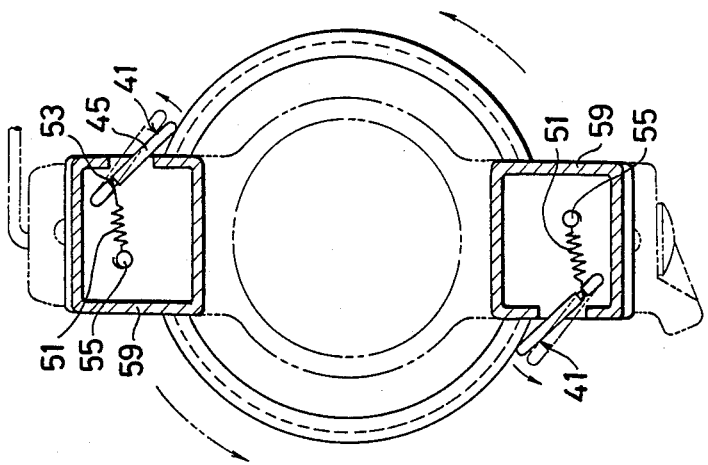
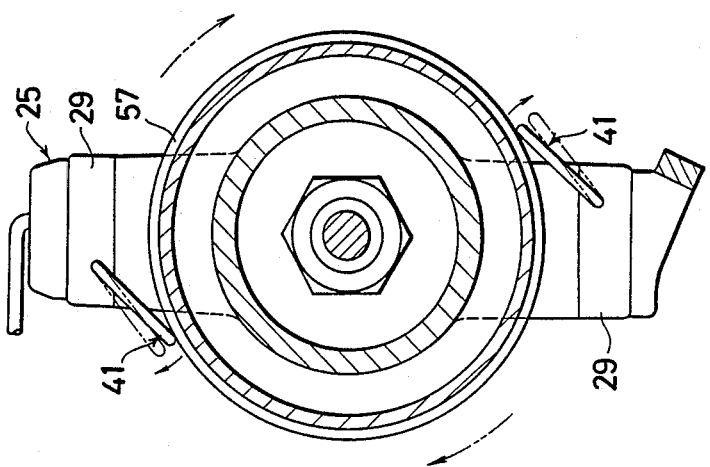

FISHLINE SLIP-OFF PREVENTION DEVICE FOR A SPINNING REEL

The present invention relates to a spinning reel, and more particularly to a fishline slip-off prevention device for a spinning reel, which is adapted to prevent a fishline from entering the rotor side.

Generally, spinning reels are constructed such that a rotor having a pair of bail support arms is rotatably supported to the front portion of a reel body, and a fishline is wound around a spool disposed inside the bail support arms upon rotation of the rotor.

When the fishline is wound around the spool in such spinning reels, the fishline may enter the rotor side. If this happens, the fishline cannot be wound around the spool regularly. In the event the fishline gets tangled over the rotor, a problem will arise in that an oscillating mechanism fails to move the spool back and forth.

In order to prevent a fishline from entering the rotor side, there have been devised spinning reels equipped with fishline slip-off prevention devices, as disclosed in Japanese Utility Model Laid-Open Nos. 60-19376 and 60-106446, etc., for example.

However, this type conventional fishline slip-off prevention devices for spinning reels are constructed such that a fishline ingress inhibitor is rotatably supported to the spool or spool shaft and engaged with a bail support arm for preventing the fishline from entering the rotor side. Therefore, high accuracy is required for both the fishline ingress inhibitor and the associated components. Also, a somewhat clearance is necessarily present in the inhibitor section because of construction tolerance, so there is a fear that the fishline may enter the rotor side through such a clearance. A further problem arises in that the structure of the fishline ingress inhibitor increases the size and weight of the spinning reel.

Moreover, in the conventional fishline slip-off prevention devices for spinning reels, the fishline ingress inhibitor is rotated in slide contact with the spool or spool shaft while being subjected to frictional resistance at all times, thereby resulting in a problem that the frictional resistance makes the fisherman feel very heavy in rotating a handle to reel up the fishline around the spool.

The present invention has been accomplished to solve the foregoing problem in the prior art, and has for its object to provide a fishline slip-off prevention device for a spinning reel which is simple in structure and can positively prevent the fishline from entering the rotor side.

The present invention resides in fishline slip-off prevention device for a spinning reel comprising a rotor, which has a bail support arm on its outer periphery, rotatably supported to the front portion of a reel body, and a spool disposed inside the bail support arm for winding up a fishline around the spool upon rotation of the rotor, wherein a fishline ingress inhibitor held in abutment against a flanged portion of the spool is swingably supported to the bail support arm and also urged toward the spool by an urging mechanism.

The fishline ingress inhibitor comprises an abutment portion abutting against the flanged portion of the spool, and one or a pair of support portions extending from one end or the opposite ends of the abutment portion and swingably supported to the bail support arm.

The urging mechanism comprises a spring member having one end fixed to the support portion of the fishline ingress inhibitor and the other end fixed to the bail support arm.

According to the present invention, since the fishline ingress inhibitor held in abutment against the flanged portion of the spool is swingably supported to the bail support arm and also urged toward the spool by the urging mechanism, the fishline ingress inhibitor positively abuts against the flanged portion of the spool and hence the fishline can positively be prevented from entering the rotor side while the rotor is in rest or inhibitor being rotated at low speeds during which time the fishline more likely tends to slip off the spool.

While the rotor is being rotated at medium or high speeds during which time the fishline is relatively hard to slip off the spool, the fishline ingress inhibitor is subjected to a relatively large centrifugal force so that the abutting force of the fishline ingress inhibitor against the flanged portion of the spool is lessened, or a small gap is created between the fishline ingress inhibitor and the flanged portion under the action of such a centrifugal force.

BRIEF DESCRIPTION OF THE DRAWINGS

FIG. 2 is a cross-sectional view taken along the line II—II in FIG. 1;

FIG. 3 is a cross-sectional view taken along the line III—III in FIG. 1;

EMBODIMENTS

The present invention will be described in detail in connection with preferred embodiments.

Figure 1:
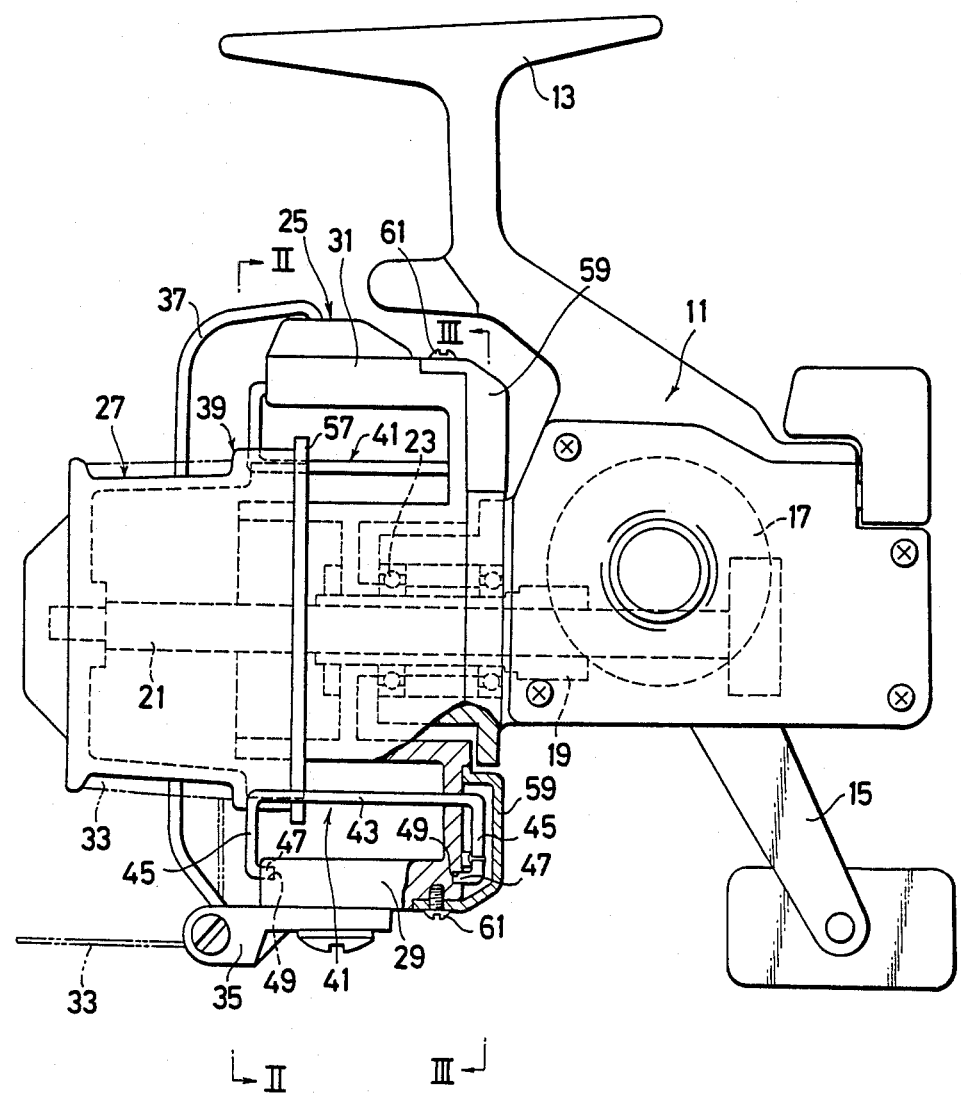
FIG. 1 is a side view showing a spinning reel equipped with one embodiment of a fishline slip-off prevention device for a spinning reel according to the present invention.

FIGS. 1 through 3 show a spinning reel equipped with one embodiment of a fishline slip-off prevention device for a spinning reel according to the present invention, in which designated at the reference numeral 11 is a reel body provided with a mount leg 13 by which the spinning reel is mounted to a fishing rod.

The reel body 11 accommodates therein a drive gear 17 that is driven upon rotation of a handle 15.

A spool shaft 21 having a pinion 19 disposed within the reel body 11 extends forward beyond the front surface of the reel body 11, and a rotor 25 is rotatably fitted over the spool shaft 21 at a portion near to the reel body 11 through a bearing 23.

In front of the rotor 25, a spool 27 is also fitted over the spool shaft 21 such that it is movable back and forth in synchronous relation with rotation of the handle 15 by an oscillating mechanism (not shown).

A pair of bail support arms 29, 31 are provided on the outer periphery of the rotor 25 in opposite relation, and a guide member 35 for guiding a fishline 33 is attached to one 29 of the bail support arms.

Further, a bail arm 37 is disposed forwardly of the bail support arm 31 of the rotor 25.

In this embodiment, a fishline ingress inhibitor 41 held in abutment against a flanged portion 39 of the spool 27 is swingably supported to each of the opposite bail support arms 29, 31.

More specifically, in this embodiment, the fishline ingress inhibitor 41 comprises an abutment portion 43 abutting against the flanged portion 39 of the spool 27, and a pair of support portions 45 extending from the opposite ends of the abutment portion 43, each of the support portions 45 having formed its end a locking portion 47 bent inward.

The locking portion 47 is fitted into one of locking holes 49 formed in the front and rear surface of each of the bail support arms 29, 31, so that the fishline ingress inhibitor 41 is swingably supported to each of the bail support arms 29, 31.

Furthermore, in this embodiment, the fishline ingress inhibitor 41 is urged toward the spool 27 by an urging mechanism.

As shown in FIG. 3, the urging mechanism comprises a tension spring 51 which has one end fixed into a recessed slot 53 defined in the support portion 45 of the fishline ingress inhibitor 41, and the other end fixed to a projection 55 provided on the rear surface of each of the bail support arm 29, 31 to project therefrom.

It should be noted that, in this embodiment, the fishline ingress inhibitor 41 is formed by bending a linear material such as wire, and the abutment portion 43 of the fishline ingress inhibitor 41 has a length longer to some extent than a stroke of the spool 27 which is moved back and forth by the oscillating mechanism.

Further, in this embodiment, a collar 57 is formed on the flanged portion 39 at one end near to the reel body 1, and the abutment portion 43 of the fishline ingress inhibitor 41 is held in abutment against the collar 57.

Finally, in this embodiment, a cover 59 for covering the support portion 45 of the fishline ingress inhibitor 41 and the tension spring 51 is fixed to the rear surface of each of the bail support arms 29, 31 by means of screws 61.

In the spinning reel equipped with the fishline slip-off prevention device thus constructed, when the handle 15 is rotated, the rotor 25 having the pair of bail support arms 29, 31 is also rotated, thereby causing the fishline 33 to be reeled up around the spool 27 disposed inside the bail support arms 29, 31.

With the fishline slip-off prevention device for the spinning reel thus constructed, since the fishline ingress inhibitor 41 held in abutment against the flanged portion 39 of the spool 27 is swingably supported to each of the bail support arms 29, 31 and also urged toward the spool 27 by the urging mechanism comprising the tension spring 51, the fishline ingress inhibitor 41 can positively abut against the flanged portion 39 of the spool 7 while the rotor 25 is in rest or being rotated at low speeds during which time the fishline more likely tends to slip off the spool 27. Thus, the fishline 33 is positively prevented from entering the side of the rotor 25.

While the rotor 25 is being rotated at medium or high speeds during which time the fishline is relatively hard to slip off the spool 27, the fishline ingress inhibitor 41 is subjected to a relatively large centrifugal force so that a small gap is created between the fishline ingress inhibitor 41 and the flanged portion 39 under the action of such a centrifugal force.

In other words, the fishline slip-off prevention device for the spinning reel thus constructed makes it possibly to positively prevent the fishline 33 from entering the side of the rotor 25 by supporting the fishline ingress inhibitors 42 of channel-like simple configuration to the bail support arms 29, 31 in a swingable manner and just holding them in abutment against the spool 27.

As a result, unlike the prior art, the present invention does not require high accuracy for associated components of the fishline ingress inhibitor, and can eliminate an increase in size and weight of the spinning reel due to a specific bulky structure of the fishline ingress inhibitor.

Furthermore, with the fishline slip-off prevention device for the spinning reel thus constructed, since the fishline ingress inhibitor 41 is subjected to a relatively large centrifugal force and a small gap is created between the fishline ingress inhibitor 41 and the flanged portion 39 under the action of such a centrifugal force while the rotor 25 is being rotated at medium or high speeds during which time the fishline is relatively hard to slip off the spool 27, there occurs no frictional resistance between the fishline ingress inhibitor 41 and the flanged portion 39 while the rotor 25 is being rotated at such medium or high speeds, so that the handle 15 can more easily be rotated when reeling up the fishline around the spool.

In addition, in this embodiment, since the collar 57 is formed on the end of the flanged portion 39, and the abutment portion 43 of the fishline ingress inhibitor 41 is held in abutment against the collar 57, the abutting area between the fishline ingress inhibitor 41 and the flanged portion 39 is reduced, which enables to more positively prevent the fishline 33 from entering the side of the rotor 25.

Figure 4:
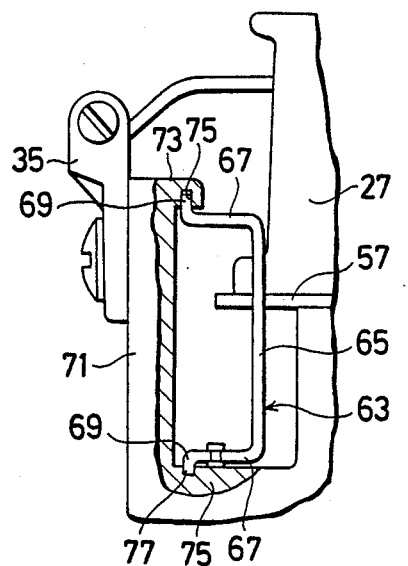
FIG. 4 is a side view of another embodiment of the fishline slip-off prevention device for the spinning reel according to the present invention, showing details of a fishline ingress inhibitor and thereabout.

FIG. 4 shows another embodiment of the present invention in which a fishline ingress inhibitor 63 comprises an abutment portion 65 abutting against a collar 57 of a spool 27 and a pair of support portions 65 extending from the opposite ends of the abutment portion 65, each of the support portions 67 having formed its end a locking portion 69 bent outward.

One of the locking portions 69 is fitted into a locking hole 75 in an inner projection 73 formed at the front portion of a bail support arm 71 and projecting inward, while the other of the locking portions 69 is fitted into a locking hole 77 formed in the inner surface of a connection portion 75 of the bail support arms 71, so that the fishline ingress inhibitor 63 is swingably supported to the bail support arms 71.

The fishline slip-off prevention device for the spinning reel thus constructed can also provide the similar effect as obtainable with the embodiment shown in FIG. 1.

Figure 5:
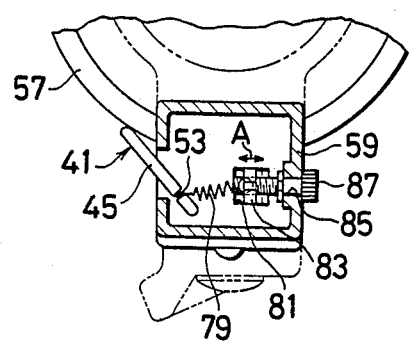
FIG. 5 is a sectional view of still another embodiment of the fishline slip-off prevention device for the spinning reel according to the present invention, showing details of a fishline ingress inhibitor and thereabout.

FIG. 5 shows still another embodiment of the present invention in which a tension spring 79 constituting the urging mechanism has one end fixed into the recessed slot 53 defined in the support portion 45 of the fishline ingress inhibitor 41, and the other end fixed to a movable piece 83 accommodated in a rectangular recessed groove 81 defined in the rear surface of the bail support arm 29 to project therefrom.

A screw 87, which is rotatably inserted through and supported by a through hole 85 bored in the cover 59, is threaded with the movable piece 83 so that by rotating the screw 87, the movable piece 83 is shifted in the directions of a double-headed arrow A in FIG. 5.

Thus, with the fishline slip-off prevention device for the spinning reel of this embodiment, since a resilient force of the tension spring 79 can be varied by rotating the screw 87, it becomes possible to set an optimum value of the abutting force of the fishline ingress inhibitor 41 against the spool 27, i.e., the tensile force of the tension spring 79, in view of various fishing conditions such as the kind of fishes to be angled, the type of fishlines used, the intensity of wind, and the speed of reeling.

Figure 6:
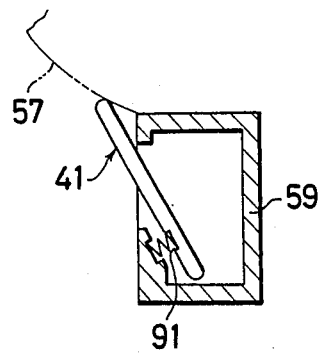
FIGS. 6 and 7 are cross-sectional views of still further embodiments of the fishline slip-off prevention device for the spinning reel according to the present invention, showing details of an urging mechanism.
Figure 7:
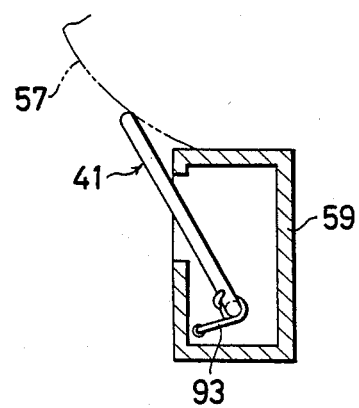

Although the urging mechanism has been described as comprising a tension spring, it may be constituted using a compression spring 91 as shown in FIG. 6, or a torsion spring 93 as shown in FIG. 7.

Figure 8:
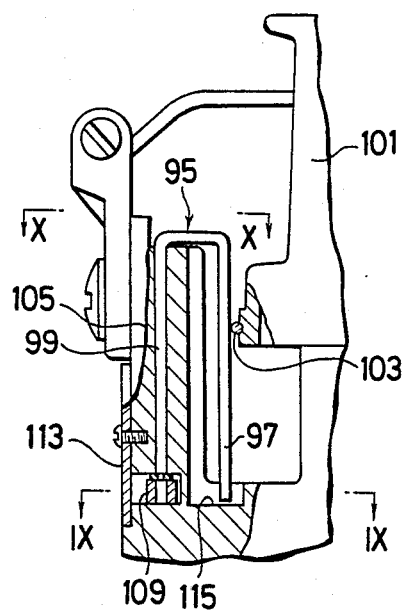
FIG. 8 is a sectional view of still another embodiment of the fishline slip-off prevention device for the spinning reel according to the present invention, showing details of a fishline ingress inhibitor and thereabout.
Figure 9:
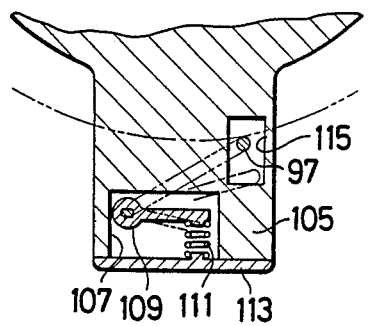
FIG. 9 is a cross-sectional view taken along the line IX—IX in FIG. 8.
Figure 10:
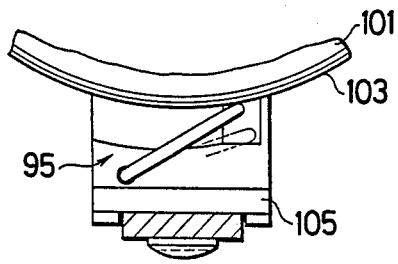
FIG. 10 is a cross-sectional view taken along the line X—X in FIG. 8.

FIGS. 8 through 10 show still another embodiment of the present invention in which a fishline ingress inhibitor 95 comprises an abutment portion 97 abutting against a collar 103 of a spool 101, and a support portion 99 extending from one end of the abutment portion 97 and bent to run in parallel thereto, the support portion 99 having its end which is swingably supported in a slot 107 formed in the outer surface of the bail support arm 105.

A swingable plate 109 is attached to the end of the support portion 99 accommodated in the slot 107 such that it can be turned together with the fishline ingress inhibitor 95. A compression spring 111 is provided on the swingable plate 109 for pressing same at all times, and has its free end held in abutment against a cover 113 which is attached to the outer surface of a bail support arm 105. Consequently, the fishline ingress inhibitor 95 is swingably supported to the bail support arm 105.

Incidentally, the other end of the abutment portion 97 is movably positioned within a recess 115 defined in the bottom of the bail support arm 105.

The fishline slip-off prevention device for the spinning reel thus constructed can also provide the similar effect as obtainable with the embodiment shown in FIG. 1.

As described above, according to the present invention, since the fishline ingress inhibitor held in abutment against the flanged portion of the spool is swingably supported to each of the bail support arms and also urged toward the spool by the urging mechanism, the fishline can positively be prevented from entering the side of the rotor with a simple structure. When reeling up the fishline, the centrifugal force produced lessens the abutting force of the fishline ingress inhibitor against the flanged portion of the spool or makes the fishline ingress inhibitor away from the flanged portion, resulting in the advantage that the fishline can be reeled up lightly and quickly because there occurs no frictional resistance.

What is claimed is:

1. A fishline slip-off prevention device for a spinning reel, comprising: a reel body;
   a rotor rotatably supported at a front portion of the reel body;
   a bail support arm on the rotor;
   a spool disposed inside said rotor and having an annular flange at one end thereof;
   means for rotating said rotor to wind fishline onto said spool;
   a fishline ingress inhibitor which is pivotably mounted on the bail support arm;
   and means for resiliently biasing the fishline ingress inhibitor into engagement with the annular flange of said spool;
   whereby said fishline ingress inhibitor prevents fishline from entering a gap between the annular flange of the spool and the rotor.

2. A fishline slip-off prevention device for a spinning reel according to claim 1, wherein said fishline ingress inhibitor comprises a central abutment portion abutting against the annular flange of said spool, a pair of support portions extending from opposite ends of said central abutment portion, and means for pivotally mounting said support portions on said bail support arm.

3. A fishline slip-off prevention device for a spinning reel according to claim 1, wherein said fishline ingress inhibitor comprises an abutment portion abutting against the annular flange of said spool, a support portion extending from one end of said abutment portion, and means for pivotally mounting said support portion on said bail support arm.

4. A fishline slip-off prevention device for a spinning reel according to any one of claims 2 or 3, wherein said biasing means comprises a spring member having one end fixed to one of the support portions of said fishline ingress inhibitor and another end fixed to said bail support arm.

* * * * *